J. E. JOHANNESSEN & O. A. WAAGE.
MARLINESPIKE.
APPLICATION FILED FEB. 3, 1917. RENEWED JUNE 21, 1918.
1,274,272.
Patented July 30, 1918.
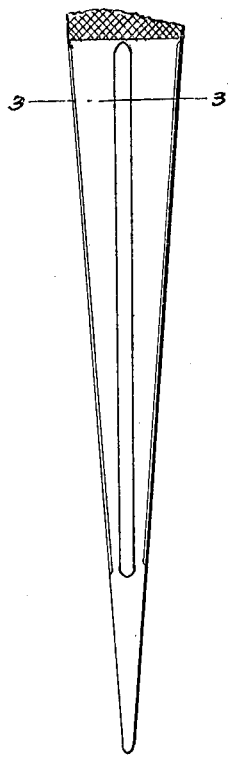
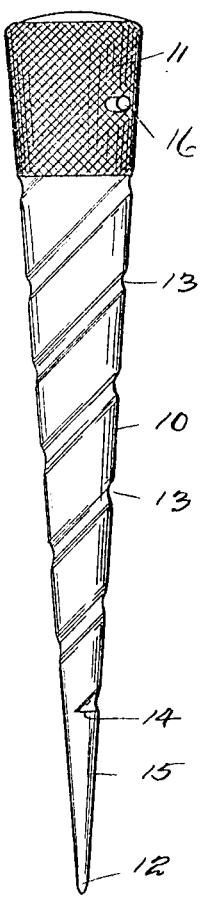
Inventor
Johan E. Johannessen
Osborne A. Waage

UNITED STATES PATENT OFFICE.

JOHAN E. JOHANNESSEN, OF BROOKLYN, AND OSBORNE A. WAAGE, OF NEW YORK, N. Y.

MARLINESPIKE.

1,274,272.  Specification of Letters Patent.  Patented July 30, 1918.

Application filed February 3, 1917, Serial No. 146,505. Renewed June 21, 1918. Serial No. 241,291.

*To all whom it may concern:*

Be it known that we, JOHAN E. JOHANNESSEN, a citizen of the United States, and OSBORNE A. WAAGE, a subject of the King of Norway, and residents of Brooklyn, county of Kings, State of New York, and New York city, in the county of New York and State of New York, respectively, have invented certain new and useful Improvements in Marlinespikes, of which the following is a specification.

This invention relates to marline spikes used for splicing ropes, wire cables and the like, and has for its object to provide such a marline spike having a tapering body with a plurality of grooves formed therein. The advantages of this construction being: First, these grooves will retain grease with which to lubricate the strands of the rope; and second, when made in a helical form the screw action of these grooves further assists the body of the spike, when rotated in the hand of the operator, to be more readily passed through the strands of a heavy rope or cable.

A further object of the invention is to form the edges of the groove rounding so as not to abrade, cut or roughen the strands of the rope in passing therethrough.

With these and other objects in view, the invention consists of certain novel features of construction, as will be more fully described, and particularly pointed out in the appended claim.

In the accompanying drawing:

Figure 1— is a side elevation showing the screw form of groove in the body of the spike.

Fig. 2— shows the straight or longitudinal grooves formed in the body of the spike.

Fig. 3— is a section on line 3—3 of Fig. 2.

Our improved spike may be constructed of any suitable material, but we preferably form the same of metal. The body of the spike is formed tapering from the handle portion 11 which is preferably knurled, toward the pointed end 12.

An essential feature of this invention is that the body portion is provided with a plurality of helically formed grooves 13 which extend from the handle portion, down adjacent the point 14 leaving a plain or ungrooved portion 15 at the end.

Another essential feature of this construction is that the grooves are formed shallow and their edges are nicely rounded over so as not to cut, abrade or roughen the strands of the rope in passing therethrough.

Our improved form of marline spike has the following advantages over the smooth type: First, the grooves are adapted to carry a limited amount of grease or other lubricant, to reduce to the minimum the friction of passing the spike through the strands of a rope in splicing; second, these helical grooves act like a screw which when rotated, greatly assist the operator in passing the spike through the strands of the rope which is of especial advantage particularly in splicing hard laid rope such as wire rope or the like, thus greatly facilitating the splicing operation.

The marline spike is provided with an eye 16 through which a lanyard may be passed.

We do not wish to be limited to the forming of a helical groove about the body of the spike as in some cases the grooves may be formed longitudinally thereof as illustrated in Figs. 2 and 3.

We have illustrated one form of our invention but the details of construction may be varied if necessary. We, therefore, desire it to be understood that we reserve the privilege of resorting to all the mechanical changes to which the device is clearly susceptible, the invention being defined by the appended claim.

We claim:

A marline spike having a handle portion and a tapering working portion substantially cylindrcal in cross-section throughout its length, said working portion having on its exterior surface a plurality of longitudinally-disposed channels adapted to carry lubricant, the edges of said channels being rounded to prevent abrading the work.

In testimony whereof we affix our signatures in presence of two witnesses.

JOHAN E. JOHANNESSEN.
OSBORNE A. WAAGE.

Witnesses:
HOWARD E. BARLOW,
GEORGE F. SEWARD.

Copies of this patent may be obtained for five cents each, by addressing the "Commissioner of Patents, Washington, D. C."